United States Patent [19]

Williams

[11] Patent Number: 4,937,400
[45] Date of Patent: Jun. 26, 1990

[54] MOUNTING AND RETAINING APPARATUS FOR CONDUCTORS

[76] Inventor: James W. Williams, 370 E. Main St., Somerville, N.J. 08876

[21] Appl. No.: 442,017

[22] Filed: Nov. 28, 1989

Related U.S. Application Data

[63] Continuation-in-part of Ser. No. 276,127, Nov. 25, 1988, abandoned.

[51] Int. Cl.$^5$ .............................................. H02G 3/04
[52] U.S. Cl. ..................................... 174/95; 174/68.3; 174/117 A
[58] Field of Search ................ 174/48, 49, 68.3, 70 C, 174/95, 97, 101, 117 A; 52/287, 288; 439/209, 210, 216

[56] References Cited

U.S. PATENT DOCUMENTS

| | | | |
|---|---|---|---|
| 2,701,819 | 2/1955 | Hirtle | 174/117 A |
| 2,704,302 | 3/1955 | Budd | 174/175 |
| 2,885,460 | 5/1959 | Borresen et al. | 174/70 C |
| 3,029,303 | 4/1962 | Severino | 174/97 |
| 4,255,610 | 3/1981 | Textoris | 174/97 X |
| 4,602,124 | 7/1986 | Santucci | 174/101 |

FOREIGN PATENT DOCUMENTS

| | | | |
|---|---|---|---|
| 571724 | 10/1958 | Belgium | 174/117 A |
| 2232945 | 1/1974 | Fed. Rep. of Germany | 174/48 |
| 2540840 | 3/1977 | Fed. Rep. of Germany | 174/117 A |
| 1409853 | 7/1965 | France | 174/97 |
| 1030371 | 5/1966 | United Kingdom | 174/68.3 |
| 1206101 | 9/1970 | United Kingdom | 174/48 |

OTHER PUBLICATIONS

"Scotchflex Cable Clips and Cable Duct—for neat, easy training of cable or wire", looseleaf pages (2) from 3M Company catalog. Received in PTO 8-11-1969. Copy in 174-117 A.
Mitchell et al., "Cable Enclosure", *IBM Technical Disclosure Bulletin*, vol. 12, No. 12, May 1970, page 2293. Copy in 174-68.3.
Pinnolis, S., "Wire Securing Clip", *Western Electric Technical Digest*, No. 50, Apr. 1978, pages 23 and 24. Copy in 174-117A.

Primary Examiner—Laramie E. Askin
Attorney, Agent, or Firm—Walter Weick

[57] ABSTRACT

Mounting and retaining apparatus for electrical, optical, or fluid conductors has a pair of resilient top members cantilevered from relatively rigid vertical sidewalls which are attached to a relatively rigid horizontal base member. The apparatus defines a rectangular channel in which the conductors are housed. The apparatus is adapted to allow conductors to be easily inserted into or removed from the channel via a one-hand operation. Insertion is accomplished by placing a conductor over the top members and pushing down on them so as to cause an opening between the top members which is sufficient to allow the conductors to enter the channel. The resilient top members may overlap to hide the conductors retained in the channel or they may be spaced apart.

15 Claims, 2 Drawing Sheets

MOUNTING AND RETAINING APPARATUS FOR CONDUCTORS

CROSS REFERENCE TO RELATED APPLICATION

This is a continuation-in-part of my application Ser. No. 276,127, filed on Nov. 25, 1988, which parent patent application is abandoned upon the filing of this continuation-in-part patent application.

FIELD OF INVENTION

This invention relates to apparatus which facilitates the mounting, retention, and easy insertion and removal of electrical, optical, or fluid conductors.

BACKGROUND OF THE INVENTION

A plurality of cable holders have been developed which facilitate the mounting and retaining of conductors. Many of these holders are permanently mounted. Removal thereof often destroys the holder and mars the surface to which it was mounted. These holders often require tools and other parts such as fasteners or clips. Installation and removal of these holders is time consuming and typically requires an installer to use two hands.

Advances in the development of plastics and adhesives provided alternatives to the use of tools and a multiplicity of parts. U.S. Pat. No. 2,701,819 (S. A. Hirtle) describes an electrical cord having a surface coated with an adhesive to enable the cord to be easily attached to a wall. A thin strip of insulating material could also connect a pair of metallic conductors, and then the adhesive would be applied to the underside of the flat insulating strip. A longitudinally scored centerline and a plurality of spaced holes provides means for separation when the cords are to be used singly. Mounting of this cord is typically a two-handed operation to ensure that the cord is straight, flush, and mounted in an attractive manner. One drawback is that the cord is still exposed to view after attachment.

U.S. Pat. 2,704,302 (R. W. Budd) describes apparatus comprising a plano-convex base, a projection extending from the side of the base, a longitudinal bore extending through the center of the projection, and a longitudinal slit extending down the upper surface of the projection. An adhesive material is applied to the plano side of the base. The apparatus has a considerable cross section compared to the cavity which holds the conductor. This ratio of cross section to cavity area adds to the cost of material and weight of the apparatus. Repeated flexure of the joint area between the plano-convex base and the projection could also cause fatigue and cracking of the material.

Belgian Patent No. 571,724 (J. L. C. Wuyts, et al.) describes an apparatus with a cross section resembling a slightly closed letter U. The cavity area is shaped to complement the shape of the conductor to be inserted. A large portion of the upper surface of an inserted conductor remains exposed. This is particularly unsightly if the conductor shape and color did not match the apparatus.

The apparatus described in U.S. Pat. No. 2,885,460 (J. Borresen and G. N. Pettersen) has a cross section which is similar to the apparatus of the above-described Belgian Patent. Again, a large part of the captive conductor is exposed from the uncovered groove of the retaining apparatus. This diminishes retention capability and can be unsightly.

The Adhesively Secured Electrical Devices described in U.S. Pat. No. 3,029,303 (J. Severino) have a cross section with a flat, adhesively backed base, and sidewalls which approach the apex of a triangle but then hook downward to form a V-shaped upper surface with a slot at the bottom of the V. This V-shaped upper surface allegedly aids during insertion of a conductor, but the hook-shaped inner surface of the sidewalls impedes removal of a conductor placed therein and strains the adhesive bond to the mounting surface.

Mitchell et al. "Cable Enclosure" (IBM Technical Disclosure Bulletin, Vol. 12, No. 12, May 1970, Page 2293) shows another apparatus with a V-shaped upper surface. Cables can be inserted or withdrawn by spreading the flexible closure with an appropriate tool. As in the device of Severino described above, the V-shaped upper surface impedes removal of a conductor.

S. Pinnolis' "Wire Securing Clip" (Western Electric Technical Digest, No. 50, April, 1978, pages 23 and 24) shows lateral portions of a wiring clip which has thickened rounded edges formed thereon. These edges are biased toward each other by residual stress from a molding operation. In another embodiment, U-shaped clasp sections are formed on the end of each lateral section, which clasp sections engage each other after insertion of each individual wire. This hooking action impedes the easy, one-handed insertion and removal of conductors.

The Ducting System for Wiring Having Channel Alignment Interface Members described in U.S. Pat. No. 4,602,124 (D. Santucci) shows a generally U-shaped channel comprising a bottom and a pair of spaced sidewalls. Parallel slots on the inner surfaces of the sidewalls permit flat cable retainers to be snapped into these slots. A U-shaped channel slips over the channel and flat cable retainer assembly. A multiplicity of different parts needs to be stocked to practice this invention.

German Printed Application No. 2,232,945 (G. Flegler) shows a cable duct composed of two different channel-shaped sections, one fitting over the other. Fine teeth on parallel sections of both sections engage each other to hold the lid section securely in place. Different parts must be stocked to practice this invention.

United Kingdom Patent Specification No. 1,206,101 (J. Walton) shows an electrical conduit in several configurations to provide a hollow formation with a longitudinal narrow opening. In some applications the conduit is placed in walls or floors in open channel ducts. A tool is needed to draw cables into the conduit and another tool is needed to install wires in the conduit at corners and other recesses.

U.S. Pat. No. 4,255,610 (M. A. Textoris) shows a wiring system for an office partition assembly in which mitered panel channels engage mitered post channels. An integral hanger assembly is removably attachable to the partition assembly adjacent to each post which separates and supports each partition. The hanger assembly includes hook means which engage slotted members to retain the hanger assembly. A single hanger assembly at each post face serves not only to support panel wiring channels, but also a similarly configured post wiring channel. The practice of this invention requires very specific hardware, the hanger assembly, and very specific slotted members to receive and support the hanger assembly. In addition to the increased cost of this hardware, the invention cannot be practiced in installations which do not provide suitably slotted members for support.

French Patent No. 1,409,853 (R. Soranzo) shows a cross section of apparatus having two or three cavities. An upper surface is slotted to permit insertion of a conductor. The upper surface must be raised to insert the conductor because of the webs which separate the interior of the cavity. Prying up the top surface requires the insertion of a sharp tool or is at least a two-handed operation.

German Printed Application No. 25 40 840 (E. Cramer) shows apparatus having a plate-shaped cross section which contains circular grooves which are connected to a top surface by an aperture. There is a large ratio of material cross section to the useful cavity cross section which adds cost and weight to the apparatus. The heavy cross section of the members which needs to be deformed for insertion of the conductors also impedes a quick, easy, and single-handed operation which is desired.

The 3M Company produces a product with the trademark "Scotchflex" for a cable duct which has a flat adhesive backed base, and an upper section which is approximately oval shaped, where one side hooks into a groove in the upper section. This hooking action impedes the easy, one-handed insertion and removal of conductors.

It is desirable to have apparatus which houses electrical or optical conductors, or intravenous fluid conductors in hospitals or ambulances, is relatively inexpensive to manufacture, is of good appearance, facilitates ease of insertion and removal, has a relatively long lifetime, and is able to retain conductors in the presence of inadvertent pulling of the conductors.

SUMMARY OF THE INVENTION

Viewed from one aspect, the present invention is directed to apparatus for housing conductors in a channel defined by the apparatus comprising first and second resilient top members, first and second sidewalls, a base member, first and second flange members each having first and second ends and outer and inner surfaces, and a double-sided adhesive strip which is attached to the bottom surface of the base member. Each top member has first and second ends and top and bottom surfaces. The first ends of the top members are spaced apart by a predestined distance and at least portions of the bottom surfaces of the top members at or near the first ends thereof are in an approximately common plane. A first end of the first sidewall is attached to a second end of the first top member and a first end of the second sidewall is attached to the second end of the second top member. The first end of the first flange member is attached to the first end of the first sidewall, and the first end of the second flange member is attached to the first end of the second sidewall. The sidewalls provide stiffness and improved appearance in applications which are visible, such as the edge of a desk. In a typical embodiment, the channel defined is approximately rectangular. The channel has an opening which is the spacing distance between the first ends of the top members. The top members are adapted to be sufficiently resilient such that when a conductor is placed over the opening of the channel and pressure is applied thereto, the top members deflect to increase the size of the opening therebetween so as to allow the conductor to pass therethrough and into the channel. The apparatus facilitates the easy insertion and removal of electrical, optical, or fluid conductors. The mechanical design and material selection for the apparatus provide for ease and economy of production by extrusion, and extended life by minimizing fatigue and cracking after continued insertion and removal of conductors.

Various embodiments of the apparatus are adapted for mounting on walls, along the edges of desks, or near hospital beds. When the apparatus is used to retain fluid conductors, such as intravenous lines, the hardness of the resilient top members is less than the hardness of the lines so as to prevent crimping the lines. The apparatus is typically fabricated from insulating materials which can be provided in any color to match the background mounting surface.

The sidewalls and base member are typically made of a relatively hard insulating material, and the two top members, which are cantilevered from each sidewall, are made of a softer, resilient insulating material. The provision of the softer, resilient material permits the insertion or removal of conductors with one hand. The softer material also extends the life of the apparatus by minimizing the bending moment and stress at the cantilevered joint between the top and sidewall. The lowered bending stress extends the fatigue life and reduces cracking of the apparatus. An outer surface of the base is coated with or has attached an adhesive.

In another embodiment, one of the aforementioned flanges is notched on its inner surface near the end where it attaches to the sidewall. The sidewall may be broken away from the remainder of the apparatus to permit the sideways stacking of several separate sections of apparatus in applications which require a large number of retained conductors.

In applications which require the retention of even more conductors, extender sections may be employed between the aforementioned apparatuses. These extender sections have resilient top members, sidewalls, a base member, and transition members which define an approximately rectangular channel. The transition members join the sidewalls to the top members such that the transition members fit beneath the ridge left on apparatus where the flange member has been broken away. When the extender section is placed sideways between two apparatuses, all the sidewalls fit closely together due to the space provided by the transition member for the ridge remaining on the apparatus.

In another embodiment of the invention, the top members overlap so as to completely enclose the channel such that conductors placed therein are completely hidden from view and protected from dirt and extraneous matter entering the channel. The overlap is achieved either by forming the top members in nonparallel planes and keeping the sidewalls supporting the top members the same size; or by slightly enlarging one of the sidewalls to accommodate the thickness of a top member, thereby keeping overlapping top members in parallel planes.

The invention will be better understood from the following more detailed description taken with the accompanying drawings and claims.

The drawings are not to scale.

DETAILED DESCRIPTION

Figure 1:
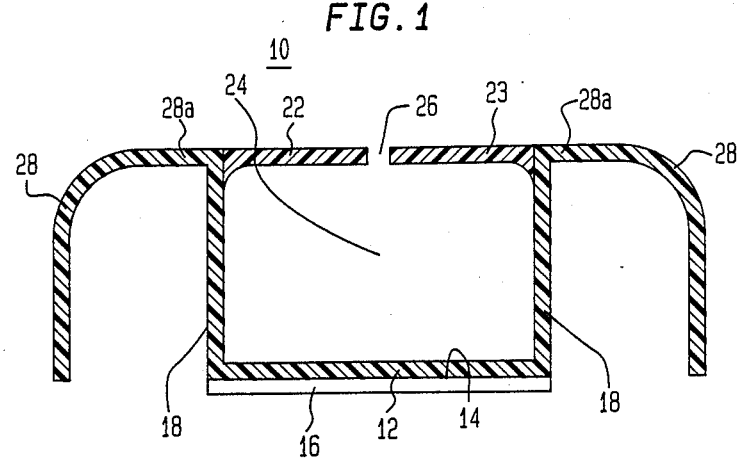
FIG. 1 shows a cross-sectional view of apparatus in accordance with one embodiment of the invention.

Referring now to FIG. 1, there is shown apparatus 10 in accordance with the invention. Apparatus 10 comprises a relatively rigid base member 12 having first and second ends and a bottom surface 14 to which is attached double-sided adhesive strip 16. Second ends of sidewalls 18 are attached to the first and second ends of base member 12, and first ends of sidewalls 18 are attached to second ends of top members 22 and 23. The upper and lower surfaces of top members 22 and 23 lie approximately in common planes, and first ends of top members 22 and 23 are spaced apart to to define an opening 26. Top members 22 and 23 may also lie in intersecting planes, or the cross section of each respective member may be slightly tapered (not shown). The base member, sidewalls, and top members define a channel 24 having a cross section which is approximately rectangular in FIG. 1, but which may also be trapezoidal. First ends 28a of flange members 28 are attached to regions where sidewalls 18 meet second ends of top members 22 and 23.

Apparatus 10 is adapted to have a conductor(s) (not shown) inserted through opening 26 into channel 24 and to be retained therein. An installer (not shown), using one hand, can place a conductor (not shown) on top of the opening 26 between first ends of top members 22 and 23 and press down on the conductor. This causes top members 22 and 23 to deflect downward such that the opening 26 therebetween increases in size so as to allow the conductor to be inserted into channel 24. As soon as the conductor clears the opening 26, the top members 22 and 23, which are designed to be resilient, spring back to the shown position.

The cross section comprising base member 12, sidewalls 18, and flange members 20 is typically a relatively rigid construction which resists bending in the transverse direction because of the high moment of inertia of the cross section. Top members 22 and 23 are typically soft and resilient so as to permit easy insertion and removal of conductors with one hand. Advantageously, top members 22 and 23 increase the useful life of apparatus 10 during insertion and removal of conductors, because they exert a relatively low bending stress at the cantilevered junctions formed by sidewalls 18 and top members 22 and 23. This reduces the potential for cracking. All parts of apparatus 10 are typically made of electrical insulating materials.

Apparatus 10 has been fabricated from plastic and was assembled in a single extrusion operation. After extrusion, apparatus 10 is typically cut to desired length with a hot knife. The cutting operation can cause a slight cylindrical deformation in top members 22 and 23 within approximately two inches from the plane of the cut. In addition, the sidewalls 18 may be inclined somewhat toward each other within approximately two inches from the plane of the cut. It was found that this manufactured apparatus 10 still facilitated easy one-handed insertion into the channel of apparatus 10 and removal therefrom.

Figure 2:
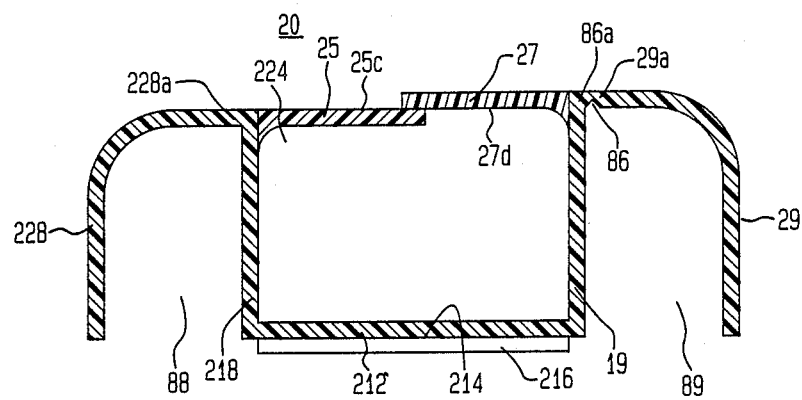
FIG. 2 shows a cross-sectional view of apparatus in accordance with another embodiment of the invention.

Referring now to FIG. 2, there is shown apparatus 20 which is in accordance with the invention. Apparatus 20 is similar to apparatus 10 of FIG. 1, and corresponding components have the same reference number with a "2" added prior thereto. Apparatus 20 comprises a relatively rigid base member 212 having a bottom surface 214 to which is attached double-sided adhesive strip 216 and sidewalls 218 and 19. Sidewalls 218 and 19 are attached to top members 25 and 27, respectively, and to the base member to define channel 224. A first end 228a of a flange member 228 is attached to a region where sidewall 218 meets top member 25, and a first end 29a of a flange member 29 is attached to a region where sidewall 19 meets top member 27. A notch 86 is formed into the inner surface of flange member 29 and is located near first end 29a of flange member 29. Flange member 228 and sidewall 218 define a cavity 88. Flange member 29 and sidewall 19 define a cavity 89.

Top member 27 is above and overlaps top member 25 such that a portion of bottom surface 27d of member 27 overlaps and is in contact with top surface 25c of top member 25. To facilitate this overlap, sidewall 19 may be slightly higher than sidewall 218, or the sidewalls may be of equal height and top members 25 and 27 would not lie in parallel planes, but intersecting planes. In an illustrative embodiment top member 27 overlaps top member 25 by a distance of 0.020 to 0.050 inch. The overlap of top members 27 and 25 serves to conceal conductors which may be different in color from apparatus 20 and helps to prevent accumulation of dirt within channel 224.

Notch 86 facilitates flange member 29 being relatively easily removed from apparatus 20. This is accomplished by bending the flange member 29 upward until the portion thereof above notch 86 breaks and severs flange member 29 from the remainder of apparatus 20, leaving a remainder section 86a. The advantage of removing one flange member 29 is to save space when stacking several of apparatuses 20 next to each other.

In applications where conductors are to be retained permanently, these conductors (not shown) may be placed in cavities 88 and 89 when apparatus 20 is installed.

Figure 3:
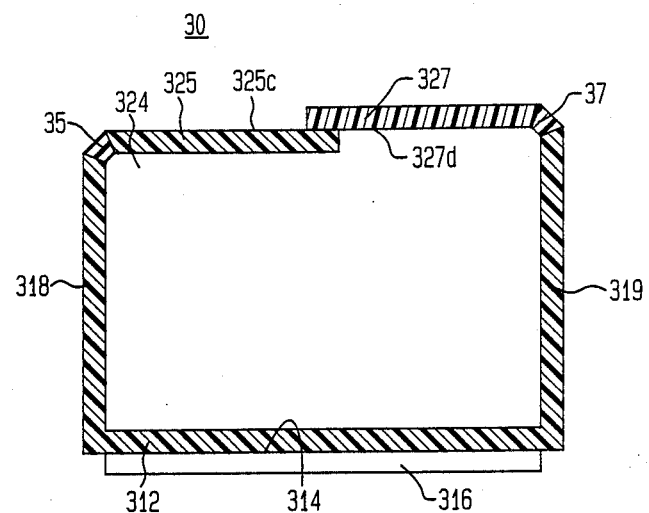
FIG. 3 is a cross-sectional view of another apparatus in accordance with the invention.

Referring now to FIG. 3, there is shown apparatus 30 in accordance with the invention. Apparatus 30 is very similar to apparatus 20 of FIG. 2 and is useful with apparatus 20 as an extender section. Apparatus 30 comprises elements which are similar to elements of apparatus 20, and corresponding elements in FIG. 3 begin with a "3" instead of a "2". Apparatus 30 comprises a relatively rigid base member 312 having first and second ends and a bottom surface 314 to which is attached double-sided adhesive strip 316. A first end of a sidewall 318 is attached to the first end of the base member 312, and a first end of a sidewall 319 is attached to the second end of base member 312. A first end of a transition member 35 is attached to a second end of sidewall 318, and a first end of a transition member 37 is attached to a second end of a sidewall 319. A first end of a top member 325 is attached to a second end of the transition member 35, and a first end of a top member 327 is attached to a second end of the transition member 37. The top member 327 is above and overlaps the top member 325 such that a portion of a bottom surface 327d of member 327 overlaps a portion of a top surface 325c of top member 325. To facilitate this overlap, sidewall 319 may be slightly higher than sidewall 318, or the sidewalls may be of equal height and top members 325 and 327 would not lie in parallel planes. In an illustrative embodiment top member 327 overlaps top member 325 by a distance of 0.020 to 0.050 inch. The partial overlap of top members 327 and 325 serves to conceal conductors which may be different in color from apparatus 30, and helps to prevent accumulation of dirt within channel 324.

Figure 4:
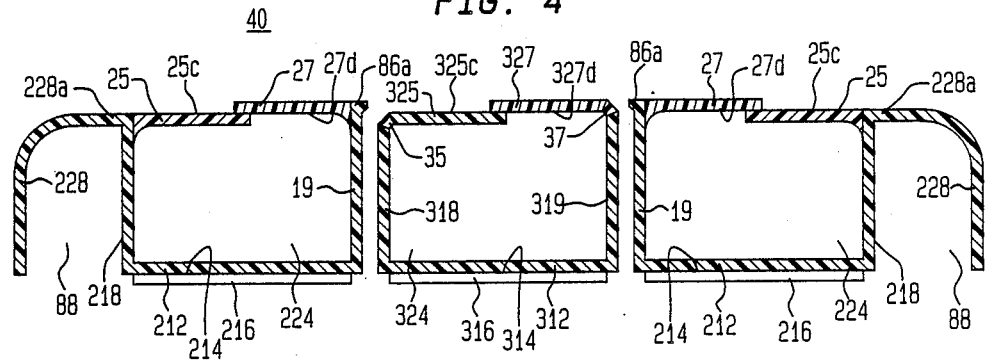
FIG. 4 is a cross-sectional view of apparatus comprising the apparatuses of FIGS. 2 and 3 in accordance with the invention.

Referring now to FIG. 4, there is shown a combination 40 in accordance with the invention. Combination 40 comprises use of apparatus 30 shown in FIG. 3 and two apparatuses 20 shown in FIG. 2 with each of flange members 29 removed at notch 86. The elements of each of apparatus 20 and 30 shown in FIG. 4 are numbered exactly as they are numbered in FIGS. 2 and 3, respectively. Remainder section 86a (shown in FIG. 4) of notch 86 remains after flange member 29 has been broken away. Remainder section 86a is adapted to fit over transition member 35 or transition member 37 to provide a smoother appearing overall upper surface of apparatus 40, closer stacking of the components of apparatus 40, and a tendency for the components of apparatus 40 to interlock. Apparatus 40 is capable of housing one or more wires, conductors or tubes in each of cavities 88, channels 224, and cavity 324.

The insulating materials referred to in the foregoing detailed description of the invention may be selected from plastics including, but not limited to, rigid and flexible polyvinylchloride, polypropylene, high and low density polyethylene, acrylonitrile butadiene styrene, ethylene vinyl acetate copolymer, thermoplastic elastomers, and thermoset elastomers. The color given to the apparatuses in FIGS. 1, 2, 3, and 4 can be selected to designate which type of conductor is housed therein.

Where reference is made to soft, resilient top members, materials with a hardness in the range of 40 to 100 durometer measured on the Durometer Shore A Scale are typically used to form them. The more rigid base, sidewalls, and flange members are typically formed from materials whose hardness ranges from 60 to 115 durometer measured on the Durometer Shore D Scale.

It is understood that the embodiments described herein are merely illustrative of the general principles of the invention. Various modifications are possible consistent with the spirit of the invention. For example, a wide variety of different insulator materials may be used and the apparatus may be provided in a series of colors which match the background of the installation or which identify the conductor means retained in the apparatus. Also, the separated edges of the top members 22 and 23, can be rounded or tapered instead of being approximately rectangular. Still further, if the conductors are non-electrical, (e.g., optical or fluid conductors) parts or all of the apparatus need not be of insulating material. Furthermore, more than one apparatus 30 can be used in combination with two of apparatus 20 so as to facilitate storage for additional conductors.

What is claimed is:

1. Apparatus for housing a conductor in a channel defined by the apparatus comprising:

first and second resilient top members each having first and second ends and top and bottom surfaces, the first ends being spaced apart by an opening, and at least portions of the bottom surfaces at and near the first ends of the top members lying in a common plane;

first and second sidewalls each having first and second ends, the first end of the first sidewall being attached to the second end of the first top member, and the first end of the second sidewall being attached to the second end of the second top member;

the second ends of the first and second sidewalls being coupled together by a base member having first and second ends, the first end thereof being attached to the second end of the first sidewall and the second end thereof being attached to the second end of the second sidewall;

the base member, sidewalls and the top members defining the channel which has an opening which is the opening between the first ends of the top members;

a double-sided adhesive strip being attached to a bottom surface of the base member;

first and second flange members each having first and second ends;

the first end of the first flange member being attached to the first end of the first sidewall, and the first end of the second flange member being attached to the first end of the second sidewall; and the top members being sufficiently resilient such that when a conductor is placed over the opening of the channel and pressure is applied thereto, the top members deflect and thus increase the size of the opening therebetween so as to allow the conductor to pass therethrough and into the channel.

2. Apparatus of claim 1 wherein the cross section of the channel is approximately trapezoidal.

3. Apparatus of claim 1 wherein the cross section of the channel is approximately rectangular.

4. Apparatus of claim 1 wherein the top and bottom surfaces of each of the top members lie in intersecting planes.

5. Apparatus of claim 1 wherein the top members have a hardness in the range of 40 to 100 durometer measured on the Durometer Shore A Scale, and the sidewalls, the base member, and the flange members have a hardness in the range of 60 to 115 durometer measured on the Durometer Shore D Scale.

6. The apparatus of claim 1 wherein all components of the apparatus are formed from plastics of the group consisting of rigid and flexible polyvinylchloride, polypropylene, high and low density polyethylene, acrylonitrile butadiene styrene, ethylene vinyl acetate copolymer, thermoplastic elastomers, and thermoset elastomers.

7. Apparatus for housing a conductor in a channel defined by the apparatus comprising:

first and second resilient top members each having first and second ends and top and bottom surfaces, parts of the top surface of the first top member and the bottom surface of the second top member overlapping;

first and second sidewalls, each having first and second ends, the first end of the first sidewall being attached to the second end of the of the first top member, and the first end of the second sidewall being attached to the second end of the second top member;

the second ends of the first and second sidewalls being coupled together by a base member having first and second ends with the first end thereof being attached to the second end of the first sidewall and with the second end thereof being attached to the second end of the second sidewall;

the base member, sidewalls and the top members defining the channel;

a double-sided adhesive strip being attached to a bottom surface of the base member;

first and second flange members each having first and second ends and outer and inner surfaces;

the first end of the first flange member being attached to the first end of the first sidewall, and the first end of the second flange member being attached to the first end of the second sidewall; and the top members being sufficiently resilient such that when a conductor is placed over the top members and pressure is applied thereto, the top members deflect and thus provide an opening therebetween so as to allow the conductor to pass therethrough and into the channel and then deflect back so as to have portions thereof overlapping.

8. Apparatus of claim 7 wherein one of the flange members defines a notch on its inner surface near its first end to facilitate the removal of said flange member from the remainder of the apparatus.

9. Apparatus of claim 7 wherein the cross section of the channel is approximately rectangular.

10. Apparatus of claim 7 wherein the top members lie in intersecting planes.

11. Apparatus of claim 7 wherein the top members lie in parallel planes.

12. Apparatus of claim 7 wherein the top surface of the first top member and the bottom surface of the second top member are in contact.

13. In combination:

a first apparatus for housing a conductor in a first channel defined by the apparatus comprising:

first and second resilient top members each having first and second ends and top and bottom surfaces, the top surface of the first top member and the bottom surface of the second top member overlapping;

first and second sidewalls, each having first and second ends, the first end of the first sidewall being attached to the second end of the of the first top member, and the first end of the second sidewall being attached to the second end of the second top member;

the second ends of the first and second sidewalls being coupled together by a base member having first and second ends, the first end thereof being attached to the second end of the first sidewall and the second end thereof being attached to the second end of the second sidewall;

the base member, sidewalls and the top members defining the first channel;

a double-sided adhesive strip being attached to a bottom surface of the base member;

first and second flange members each having first and second ends and outer and inner surfaces;

the first end of the first flange member being attached to the first end of the first sidewall, and the first end of the second flange member being attached to the first end of the second sidewall;

one of the flange members defining a notch on its inner surface near its first end so as to facilitate the removal of said flange member from the apparatus;

the top members being sufficiently resilient such that when a conductor is placed over the top members and pressure is applied thereto, the top members deflect and thus provide an opening therebetween so as to allow the conductor to pass therethrough and into the channel and then deflect back so as to overlap;

a second apparatus which is substantially identical to the first apparatus;

one flange member of each of the first and second apparatuses having been removed from each apparatus at the respective notches, and thus leaving a remainder section;

a third apparatus comprising:

a base member having first and second ends and a bottom surface;

a double-sided adhesive strip being attached to the bottom surface of the base member;

first and second sidewalls having first and second ends, the first end of the first sidewall being attached to the first end of the base member and the first end of the second sidewall being attached to the second end of the base member;

first and second transition members having first and second ends, the first end of the first transition member being attached to the second end of the first sidewall and the first end of the second transition member being attached to the second end of the second sidewall, so that each pair of planes containing a transition member and a sidewall intersect at an angle;

first and second top members having first and second ends and top and bottom surfaces, the first end of the first top member being attached to the second end of the first transition member and the first end of the second top member being attached to the second end of the second transition member, so that each pair of planes containing a transition member and a top member intersect at an angle;

portions of the top surface of the first top member and the bottom surface of the second top member overlapping;

the base member sidewalls, transition members, and top members defining a third channel;

the top members being sufficiently resilient such that when a conductor is placed over the top members and pressure is applied thereto, the top members deflect and thus provide an opening therebetween so as to allow the conductor to pass therethrough and into the channel and then deflect back to the original position; and the transition members of the third apparatus each being adapted to fit next to the remainder section of the first and second apparatuses which have had one flange member removed.

14. Combination of claim 13 wherein the cross section of the third apparatus is approximately rectangular.

15. Combination of claim 13 wherein portions of the top surface of the first top member and portions of the bottom surface of the second top member of each of the first, second, and third apparatuses are in contact.

* * * * *